(12) United States Patent
DuBois

(10) Patent No.: US 10,540,701 B2
(45) Date of Patent: *Jan. 21, 2020

(54) SYSTEM AND METHOD FOR ORDERING A PRINT PRODUCT USING A MOBILE COMPUTING DEVICE

(71) Applicant: FUJIFILM North America Corporation, Valhalla, NY (US)

(72) Inventor: Charles L. DuBois, Rochester, NY (US)

(73) Assignee: FUJIFILM North America Corporation, Valhalla, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/974,148

(22) Filed: May 8, 2018

(65) Prior Publication Data

US 2018/0357696 A1    Dec. 13, 2018

Related U.S. Application Data

(63) Continuation of application No. 13/959,465, filed on Aug. 5, 2013, now Pat. No. 9,965,786.

(60) Provisional application No. 61/679,688, filed on Aug. 4, 2012.

(51) Int. Cl.
*G06Q 30/00* (2012.01)
*G06Q 30/06* (2012.01)

(52) U.S. Cl.
CPC ................ *G06Q 30/0621* (2013.01)

(58) Field of Classification Search
CPC .............................. G06Q 30/06–08
USPC ............................ 705/26.1–27.2
See application file for complete search history.

(56) References Cited

U.S. PATENT DOCUMENTS

| 7,243,079 B1 | 7/2007 | Manolis et al. |
| 7,275,043 B2 | 9/2007 | Kinjo |
| 7,327,387 B2 | 2/2008 | Tanaka et al. |
| 7,502,555 B2 | 3/2009 | Ogino |
| 7,764,393 B2 | 7/2010 | Yamada et al. |
| 8,861,897 B2 | 10/2014 | Bercovich et al. |

(Continued)

OTHER PUBLICATIONS

"Idea (R) Announces New IPDS Laser Printers with Simultaneous Support for LAN Printing" (PR Newswire, Feb. 7, 1994) (https://dialog.proguest.com/professional/docview/674357915?accountid=142257) (Year: 1994).

*Primary Examiner* — Ethan D Civan
(74) *Attorney, Agent, or Firm* — Woods Oviatt Gilman LLP; Dennis B. Danella, Esq.

(57) ABSTRACT

A system and method for ordering a print product using a mobile computing device is provided. The system includes a photofinisher configured for receiving a print order from the mobile computing device and producing the print product based upon the print order. Further, a print product ordering module is configured for allowing the print order to be completed using the mobile computing device, wherein the print order includes the digital image and the print product selected using the mobile computing device. A wireless local area network is configured for placing the mobile computing device in communication with the photofinisher when the mobile computing device is located within a range of the wireless local area network. The print order completed using the mobile computing device is communicated to the photofinisher when the mobile computing device is located within the range of the wireless local area network.

30 Claims, 6 Drawing Sheets

(56) References Cited

U.S. PATENT DOCUMENTS

| | | |
|---|---|---|
| 9,965,786 B2 * | 5/2018 | DuBois .............. G06Q 30/0621 |
| 2003/0040983 A1 | 2/2003 | Chauvin et al. |
| 2004/0186792 A1 | 9/2004 | Sales et al. |
| 2005/0174430 A1 | 8/2005 | Anderson |
| 2008/0300996 A1 | 12/2008 | Fei et al. |
| 2009/0066998 A1 | 3/2009 | Kato |
| 2010/0205063 A1 | 8/2010 | Mersky |
| 2010/0310135 A1 | 12/2010 | Nagaoka et al. |
| 2011/0059728 A1 | 3/2011 | Poisson |
| 2013/0141746 A1 | 6/2013 | Miller et al. |

* cited by examiner

SYSTEM AND METHOD FOR ORDERING A PRINT PRODUCT USING A MOBILE COMPUTING DEVICE

CROSS-REFERENCE TO RELATED APPLICATIONS

This application is a continuation of U.S. patent application Ser. No. 13/959,465, now U.S. Pat. No. 9,965,786, filed Aug. 5, 2013, which claims the benefit of U.S. Patent Application No. 61/679,688, filed Aug. 4, 2012, which are hereby incorporated by reference in their entirety.

FIELD OF THE INVENTION

The present invention is directed to a system and method for ordering a print product incorporating a digital image using a mobile computing device; in particular, the system and method is directed to allowing the mobile computing device to order a print product from a fulfillment center through a wireless local area network, such as a Wi-Fi network.

BACKGROUND OF THE INVENTION

With the increasing popularity of mobile computing devices, such as smart phones, and their ability to take high resolution digital images, there is a demand for producing print products that incorporate digital images. Print products can take the form of photographic prints, calendars, photo books, posters, mugs, t-shirts, and the like. Currently there are a few different ways a consumer can order a print product incorporating a digital image.

One way to order a print product is through the use of a kiosk. A kiosk is a self-service computing device that is typically located within a mass retail store, supermarket, drug store, or other convenient location that allows a customer to upload photos and select print products to generate a print order. The selected print products identified in the print order can either be printed by the kiosk itself, or the print order can be fulfilled by a photofinisher that is in communication with the kiosk through a network. The photofinisher may be located in close proximity to the kiosk or at a remote location. In order to use a kiosk according to the existing methodology to create a print order, the digital image needs to be uploaded to the kiosk. In order to do so, the customer needs to save the digital image on a portable data storage device, such as a thumb drive or memory card, prior to arriving at the kiosk. This particular step in the photo ordering process sometimes discourages customers from using the kiosk to place a print order. For instance, an individual may not think of ordering a print product until he actually makes visual contact with the kiosk after arriving at the store, and at that point, it would be inconvenient for him to transfer a digital image from his mobile computing device to a portable data storage device that is accepted by the kiosk. As a result, no print product is ordered by the individual.

Another way to order a print product is by using a print product ordering website made available over a wide area network, such as the Internet. In using a print product photo ordering website, a digital image is uploaded to the print product ordering website, the desired print product is selected, and the print order is communicated to the fulfillment center. The ordered print product may then be picked up by the customer at a pick-up location selected by the customer, such as a mass retail store or drug store. This ordering method is inconvenient in some instances because it requires the customer to remember that a print product was ordered and that it needs to be picked up at a certain location after a specified time period. It is not uncommon for customers to forget to pick up the ordered print product. It also may be inconvenient for the customer to have to make a separate trip to the selected pick-up location.

What is needed is a system and method for ordering print products that is convenient for a customer and encourages more frequent ordering of print products. The present invention fulfills these needs as well as other needs.

SUMMARY OF THE INVENTION

In order to overcome the above stated inefficiencies, one aspect of the present invention provides a system for ordering a print product using a mobile computing device, wherein the print product incorporates a digital image. The digital image may be stored in a memory of the mobile computing device, or a digital image data storage server accessible by the mobile computing device through a wide area network, such as the Internet. The system comprises at least one photofinisher, a print product ordering module, a wireless local area network, and, optionally, a photo lab system. The photofinisher is configured for receiving a print order from the mobile computing device and producing the print product based upon the print order. The print product ordering module is configured for allowing the print order to be completed using the mobile computing device, wherein the print order includes the digital image and the print product selected using the mobile computing device. The print product ordering module may be stored in a memory located in the mobile computing device, photofinisher, or the photo lab system. The wireless local area network is configured for placing the mobile computing device in communication with the photofinisher when the mobile computing device is located within a range of the wireless local area network. The print order completed using the mobile computing device is communicated to the photofinisher when the mobile computing device is located within the range of the wireless local area network. The photo lab system is configured for receiving the print order from the mobile computing device and communicating the print order to one of a plurality of photofinishers.

In other aspects of the invention, the print product ordering module is configured for allowing for payment of the print order using the mobile computing device, and generating a bar code or other order identifying indicator that is displayed on the mobile device after payment is completed. The system also may be configured for sending a notification to the mobile computing device indicating that the ordered print product has been produced by the photofinisher. Further, the system may be configured for automatically communicating a completed print order to the photofinisher from the mobile computing device when the mobile computing device enters the range of the wireless local area network. The system also may operate to filter the print products available to include in a print order depending upon the image characteristics and attributes of the digital images selected using the mobile computing device.

In another aspect, a method is provided for ordering a print product using a mobile computing device, wherein the print product incorporates a digital image. The method comprises: providing a photofinisher configured for receiving a print order from the mobile computing device and producing the print product based upon the print order; providing a wireless local area network configured for allowing the mobile computing device to communicate with the photofinisher when the mobile computing device is located within a range of the wireless local area network; allowing the print order to be completed using the mobile computing device, the print order including the digital image and the print product selected using the mobile computing device; allowing for the communication of the completed print order from the mobile computing device to the photofinisher when the mobile computing device is located within a range of the wireless local area network; receiving the print order at the photofinisher; and producing the print product specified in the print order using the photofinisher. The method may further comprise the steps of providing a plurality of photofinishers; providing a photo lab system in communication with the plurality of photofinishers; receiving the print order from the mobile computing device at the photo lab system; and communicating the print order to one of the plurality of photofinishers.

Further, the method may include the step of communicating a print order inquiry to the mobile computing device when the mobile computing device enters the range of the wireless local area network to inform the individual in possession of the mobile computing device that certain print products are available to be ordered using the photofinishers located in the wireless local area network. The print order inquiry may also be communicated to the mobile computing device after the system recognizes that one or more digital images have been stored in the memory located in the mobile computing device within a predetermined time period, for example, within the last 30 days, when the mobile computing device enters the range of the wireless local area network. This may be used to prompt the customer to use the newly stored digital images to purchase print products using the photofinisher in communication with the wireless local area network.

In the instance that the print order is completed using the print product ordering module stored on the mobile computing device prior to entering the range of the wireless local area network, the method may further comprise the step of automatically communicating the completed print order to the photofinisher when the mobile computing device enters the range of the wireless local area network.

Additional benefits of the above-described system and method for ordering a print product using a mobile computing device are set forth in the following discussion.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawings, wherein.

DETAILED DESCRIPTION OF THE INVENTION

Generally, the tools, systems, and methods described herein for allowing a mobile computing device to order a print product from a photofinisher through a wireless local area network may be implemented in hardware, software or a combination thereof. In general, the present invention allows the mobile computing device to be placed in communication with the photofinisher upon entering a range of the wireless local area network so that a print order may be communicated to the photofinisher and fulfilled by the photofinisher. This creates a situation where the individual in possession of the mobile computing device is in relative close proximity to the photofinisher, which makes it convenient to pick-up the ordered print product after it is produced. Further, placing the mobile computing device in communication with the photofinisher through the wireless local area network allows the system to offer print products that only may be produced by that particular photofinisher, and/or offer product pricing that is applicable to the particular photofinisher. Other advantages may also be realized in view of the discussion that follows.

Figure 1:
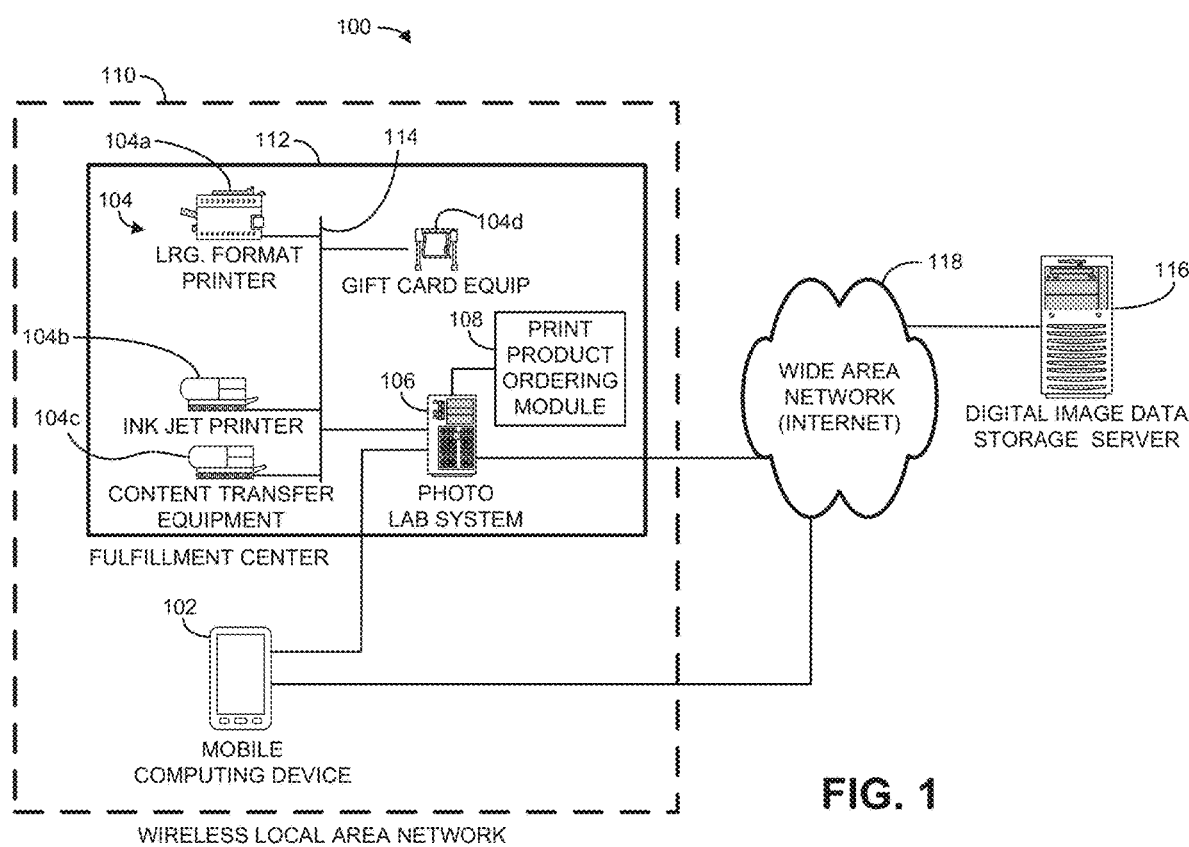
FIG. 1 is a schematic diagram showing one or more mobile computing devices in communication with a photofinisher through a wireless local area network.

Referring to the drawings in detail, with particular reference to FIG. 1, one aspect of the present invention includes a system 100 for ordering a print product using a mobile computing device 102. The system 100 may generally include one or more photofinishers 104, a photo lab system 106, a print product ordering module 108, and a wireless access point device that provides a wireless local area network 110, such as a Wi-Fi network. The photofinishers 104 and photo lab system 106 may be located in a single location, such as a fulfillment center 112, and be in communication with each other using wireless local area network 110 or a wired local network connection 114. Fulfillment center 112 may be, for example, a mass retail store or a drug store. It should be understood that mobile computing device 102 may be any type of smart phone, tablet, or other mobile device that is capable of displaying digital images and communicating with photofinisher 104 or photo lab system 106 using print product ordering module 108 through wireless local area network 110. The term "mobile," as used to describe the mobile computing device 102, is meant to indicate that mobile computing device 102 is capable of being moved into a range of wireless local area network 110 from a location outside of network 110. Mobile computing device 102 may include one or more mobile software applications that operate to allow a user of the mobile computing device to capture, save, and/or edit digital images in a memory of mobile computing device or by a third party that provides for the storage of digital images, such as a digital image data storage server 116. For example, INSTAGRAM and IPHOTO are two such mobile applications that allow for this functionality.

Figure 6:
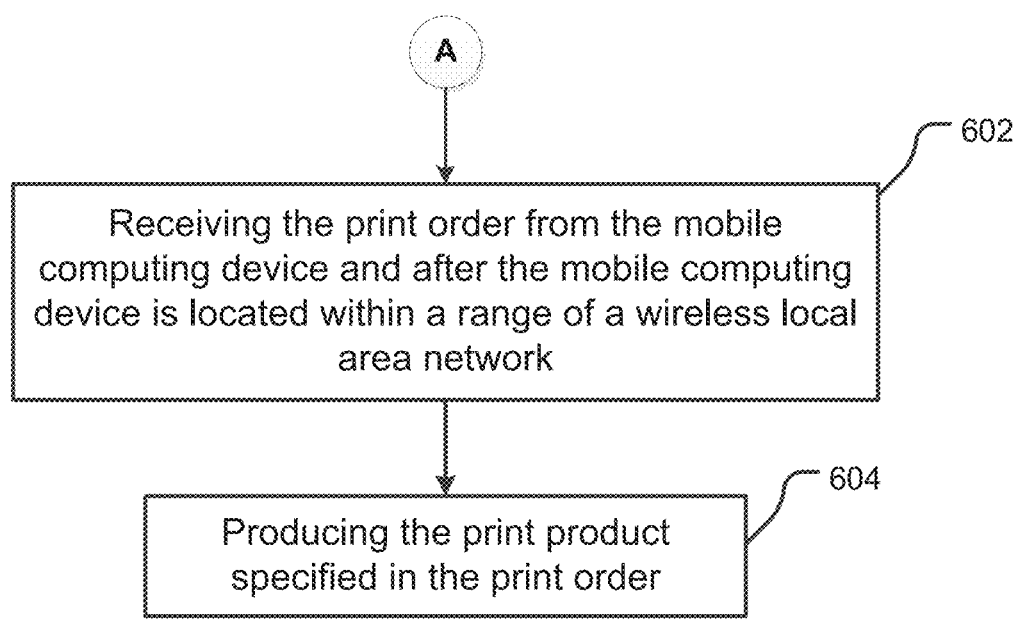
FIG. 6 is a flow diagram representing an exemplary machine algorithm for an embodiment of a print product ordering module according to one aspect of the present invention.

Each of the photofinishers 104 is a printing device that is configured for producing a print product that incorporates a digital image based on a print order. A print product can be any type of good that has a selected digital image printed thereon, such as, for example, photographic print, calendar, mug, poster, T-shirt, mouse pad, and the like. The types of print products that may be produced by photofinishers 104 include, but are not limited to, photographic prints, calendars, posters, photo books, mugs, t-shirts, gift cards, and canvas prints. Given the wide variety of print products that may be produced, system 100 may include a plurality of different types of photofinishers 104a, 104b, 104c, 104d capable of producing the print products. With additional reference to FIG. 6, in accordance with an aspect of the present invention, photofinisher 104 is configured for receiving the print order from mobile computing device 102 when mobile computing device 102 is located within a range of the wireless local area network 110 at step 602. FIG. 1 shows mobile computing device 102 located within the range of wireless local area network 110. It should be understood that photofinisher 104 may directly receive the print order from mobile computing device 102 through network 110, or indirectly receive the print order from mobile computing device 102 through photo lab system 106 using network 110 as seen in FIG. 1.

Photo lab system 106 may be in communication with each of photofinishers 104, and configured for receiving the print order from mobile computing device 102 and communicating the print order to the appropriate photofinisher 102 depending on the capabilities of the photofinisher 102 and contents of the print order. As such, photo lab system 106 may serve as a central hub for the plurality of photofinishers 102a, 102b, 102c, 102d, thereby providing an arrangement where the plurality of photofinishers are transparent to the customer so that the customer appears to be dealing with a single photofinisher to simplify the system from the customer's perspective.

Figure 5:
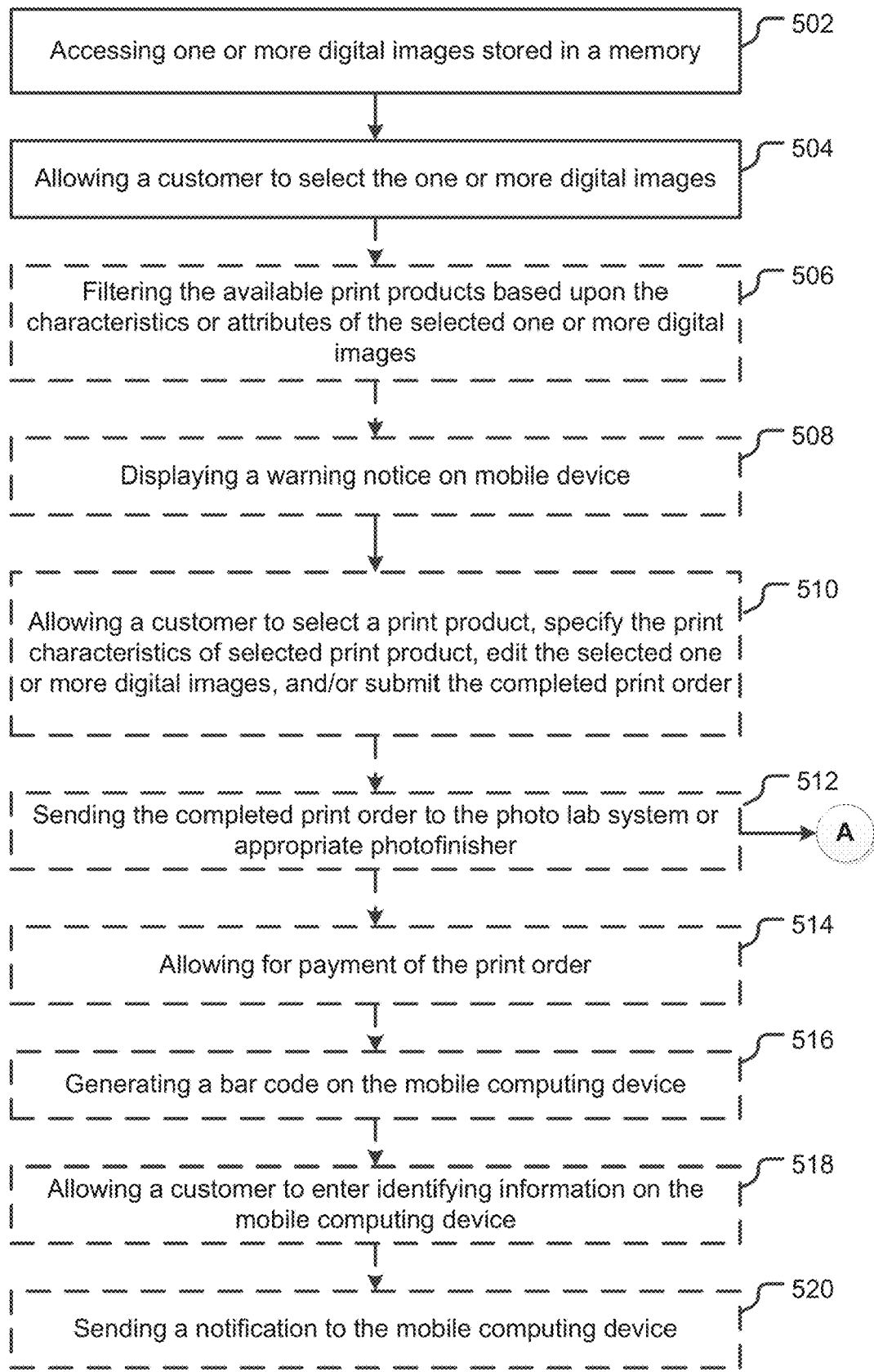
FIG. 5 is a flow diagram showing an exemplary machine algorithm for producing a print product through a photofinisher according to one aspect of the present invention.

With additional reference to FIG. 5, the print product ordering module 108 is configured for allowing the print order to be completed using mobile computing device 102. Print product ordering module 108 may be stored in a memory located in photo lab system 106, mobile computing device 102, photofinisher 102, or a combination thereof. In preparing the print order using print product ordering module 108, mobile computing device 102 may be used upload a digital image that will be included in the print product to photo lab system 106 or photofinisher 104. In selecting the digital image to be uploaded, mobile computing device 102 may access the digital images stored in a memory of mobile computing device 102 at step 502, or digital images previously stored by the customer in a memory located in a remote digital image server 116 through a wide area network 118, such as the Internet. After the digital image is selected by the customer at step 504, print product ordering module 108 may operate to filter the print products available to be selected by the customer based upon the characteristics or attributes (e.g., the image resolution) of the selected digital image at step 506. For instance, if a selected digital image has a lower resolution than is required to produce a given product, for example, a poster, then the list of print products available to the customer will be filtered so it does not include a poster. In the alternative, instead of filtering the available products, print product ordering module 108 may be configured to display a warning notice on mobile computing device 102 at step 508 indicating that a characteristic or attribute of the selected digital image could potentially result in the print product not being produced to a certain level of quality.

Print product ordering module 108 further allows for the selection of a print product, specification of print characteristics of the selected print product (such as size and color parameters), editing of the digital image, and submission of the completed print order at step 510. Print product ordering module 108 allows for the completed print order to be sent to photo lab system 106, or directly to an appropriate photofinisher 104 at step 512, when mobile computing device 102 is with the range of wireless local area network 110 so that the print product can be produced and made available to the customer at step 604.

Print product ordering module 108 may also be configured to allow for payment of the print order using mobile computing device 102 at step 514. This aspect of the system 100 may be implemented so that customer does not need to make payment when the print products are picked up by the customer. Further, print product ordering module 108 may be configured to generate a bar code that is displayed on mobile computing device 102 after payment is made using mobile computing device 102 at step 516. The bar code may then be displayed when picking up the print product produced by photofinisher 104 confirming that payment was made using mobile computing device 102. Print product ordering module 108 may also be configured to allow mobile computing device 102 to be used to enter identifying information of the individual at step 518, such as the individual's name, that will be picking up the fulfilled print order, and allow for the print product to be paid for upon pick-up. Print product ordering module 108 may also be configured to send a notification to mobile computing device 102 indicating that the ordered print product has been produced by photofinisher 104 and is ready to be picked-up at step 520.

Referring back to FIG. 1, local area network 110 may be a wireless network, such as a Wi-Fi network, that has a signal strength that provides a limited range or area in which a mobile computing may connect therewith. Wireless local area network may be provided, for example, by fulfillment center 112 or the store that fulfillment center 112 is located within. As mentioned above, wireless local area network 110 is configured for placing mobile computing device 102 in communication with an appropriate photofinisher 104 when mobile computing device 102 is located within the range of the network 110. Therefore, for instance, if the range of the network 110 corresponds to the outer limits of the structure of the store that fulfillment center 112 is located within, then a customer would be able to connect to wireless local area network 110 upon entering the store and conveniently order print products using print product ordering module 108.

Figure 2:
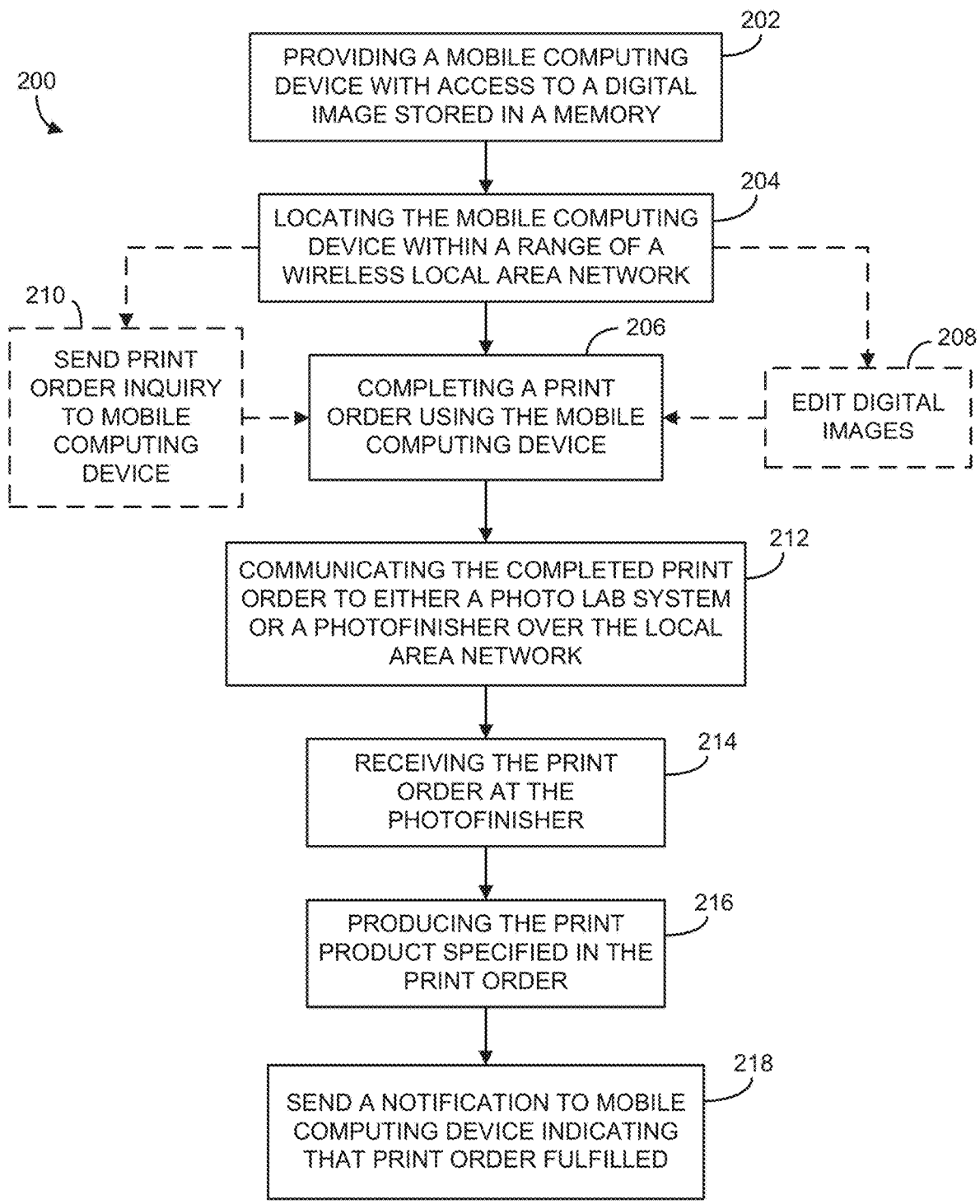
FIG. 2 is a flow diagram showing a method for ordering a print product using a mobile computing device according to one aspect of the present invention.

As best seen in FIG. 2, an exemplary method 200 for ordering a print product using a mobile computing device over a wireless local area network is shown. Method 200 comprises the step 202 of providing mobile computing device 102 with access to one or more digital images stored in a memory of mobile computing device 102, or a remote digital image data storage server 116. At step 204, mobile computing device 102 is located within a range of wireless local area network 110, and a print order is allowed to be completed using mobile computing device 102 and print product ordering module 108, at step 206. Along with completing the print order, the method 200 may allow for payment of the print order using mobile computing device 102, including the generation of the bar code that may be displayed upon pickup of the ordered print product.

Prior to completing the print order at step 206, the method 200 also allows the digital image that will be used to produce the print order to be edited at step 208. Further, prior to completing the print order at step 206, and after entering the range of wireless local area network 110, the method 200 may also include sending a print order inquiry to mobile computing device at step 210. The print order inquiry may be displayed on mobile computing device 102 to inform the individual in possession of the mobile computing device 102 that mobile computing device 102 has entered the range of wireless local area network 110 and/or that print product ordering module 108 is available to order print products using the photofinisher 104 located within the network 110. Print order inquiry may also be generated when print product ordering module 108 recognizes that one or more digital images have been stored in the memory located in the mobile computing device within a predetermined time period. For example, after mobile computing device 102 enters the range of wireless local area network 110, print product ordering module 108 would operate to determine if any new digital images were saved in the memory of mobile computing device 102 within the last 30 days, digital images that have not yet been printed, or digital images that are new since the last time the mobile computing device 102 entered the range of wireless local area network 110. Continuing with the example, if there are new digital images that were stored in the memory of mobile computing device 102 within the last 30 days, the print order inquiry would be generated and displayed on mobile computing device 102 prompting the individual in possession of mobile computing device 102 to enter a print order using one or more of the newly stored digital images.

After the print order is completed at step 206, mobile computing device 102 communicates the print order to either photo lab system 106, or directly to photofinisher 104 that is capable of producing the print product specified in the print order, at step 212. If the print order is communicated to photo lab system 106, then photo lab system 106 thereafter communicates the print order to photofinisher 104 that is capable of producing the print product specified in the print order. At step 214, the print order is then received by the appropriate photofinisher 104 to produce the print product specified in the print order at step 216. Method 200 may further include sending a notification to mobile computing device 102 indicating that the ordered print product has been produced by photofinisher 104 and is available for pick up, at step 218.

Figure 3:
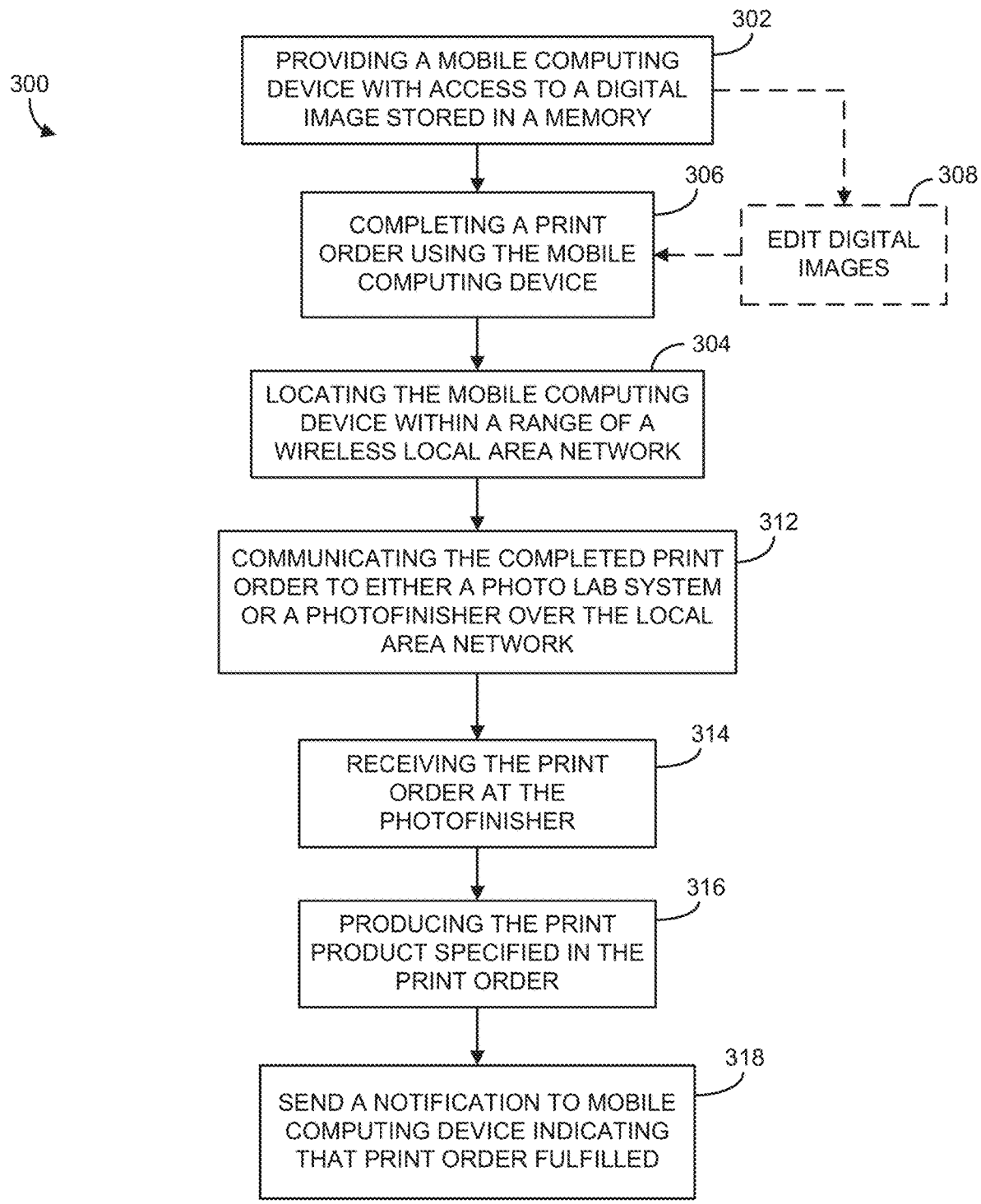
FIG. 3 is a flow diagram showing a method for ordering a print product using a mobile computing device according to another aspect of the present invention.

In another aspect of the present invention, with reference to FIG. 3, a method 300 may be provided that allows a print order to be automatically communicated to photo lab system 106 or photofinisher 104 upon mobile computing device 102 entering the range of wireless local area network 110. Many of the steps set forth in method 300 are similar to those described with respect to method 200, and need not be described in any further detail. The similar steps will be labeled with the same reference numbers as in FIG. 2 except in the 300 series. In order to automatically communicate the print order to photo lab system 106 or photofinisher 104 upon mobile computing device 102 entering the range of wireless local area network 110, print product ordering module 108 is stored in the memory of mobile computing device 102. Prior to entering the range of the wireless local area network 110, mobile computing device 102 may be used to complete the print order using print product ordering module 108 at step 306. Once mobile computing device 102 enters the range of the wireless local area network 110 at step 304, the completed print order may thereafter be manually or automatically communicated to either photo lab system 106 or the photofinisher 104 capable of fulfilling the print order, at step 312. This allows the customer to complete the print order prior to arriving at fulfillment center 112, and conveniently send the print order without the need for expending any time creating the print order after arriving at the fulfillment center 112.

By allowing a mobile computing device to order print products from photofinisher through a wireless local area network associated with a fulfillment center, numerous advantages are realized. For instance, the use of a wireless area network to connect the mobile computing device with a photofinisher creates a situation where the mobile computing device is in the general physical proximity to the photofinisher, which makes it more convenient and efficient for the individual to order a print product and pick up the ordered print product while remaining in the vicinity of the photofinisher. This eliminates the need to make a special trip to pick up the ordered print product, such as when ordering a print product over the Internet using a print product ordering website. Further, mobile devices oftentimes are used to store digital images or access digital images stored in a digital image storage server over the Internet. Therefore, using mobile computing devices to place a print order with a photofinisher is convenient and eliminates the need to plan ahead of time to save the digital image on a portable data storage device, such as a thumb drive.

Having described the system and method of the present invention and an embodiment thereof, an exemplary computer environment for implementing the described design and execution is presented next.

Figure 4:
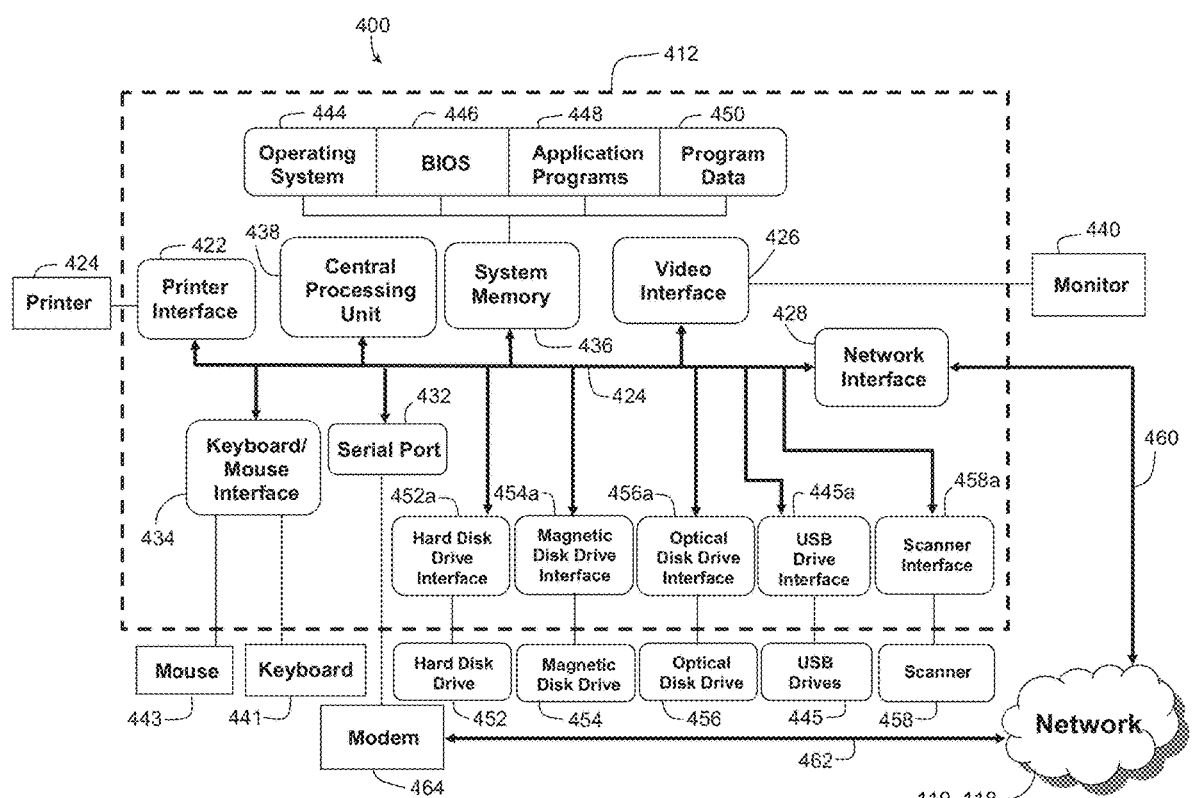
FIG. 4 is a block diagram generally illustrating a computing environment in which the invention may be implemented.

FIG. 4 shows an exemplary computing environment 400 that can be used to implement any of the processing thus far described. Computing environment 400 may include one or more computers 412 (such as photofinishers 104, photo lab system 106, mobile computing device 102, or digital image data storage server 116) comprising a system bus 424 that couples a video interface 426, network interface 428, a keyboard/mouse interface 434, a printer interface 422, and a system memory 436 to a Central Processing Unit (CPU) 438. A monitor or display 440 is connected to bus 424 by video interface 426 and provides the user with a graphical user interface to view the stored digital images, available print products, print orders, etc. The printer interface 422, for example, allows for a printer 424 associated with photofinisher 104 to be used to produce the print products specified in the print orders. The graphical user interface allows the user to enter commands and information into computer 412 using a keyboard 441 and a user interface selection device 443, such as a mouse or other pointing device, or using a touch screen system. Keyboard 441 and user interface selection device are connected to bus 424 through keyboard/mouse interface 434. The display 440 and user interface selection device 443 are used in combination to form the graphical user interface which allows the user to implement at least a portion of the present invention. Other peripheral devices may be connected to the computer through universal serial bus (USB) drives 445 to transfer information to and from computer 412. For example, cameras and camcorders may be connected to computer 412 through serial port 432 or USB drives 445 so that data representative of a digital image, or other digital content may be downloaded to system memory 436 or another memory storage device associated with computer 412 such that the images may be subsequently printed by one or more of photofinishers 104. It should be understood that the computing devices described herein, such as mobile computing device 102, may not necessarily include all of the features described herein with respect to computer 412. For example, mobile computing device 102 may not necessarily include printer 424.

The system memory 436 is also connected to bus 424 and may include read only memory (ROM), random access memory (RAM), an operating system 444, a basic input/ output system (BIOS) 446, application programs 448 and program data 450. The computer 412 may further include a hard disk drive 452 for reading from and writing to a hard disk, a magnetic disk drive 454 for reading from and writing to a removable magnetic disk (e.g., floppy disk), and an optical disk drive 456 for reading from and writing to a removable optical disk (e.g., CD ROM or other optical media). The computer 412 may also include USB drives 445 and other types of drives for reading from and writing to flash memory devices (e.g., compact flash, memory stick/ PRO and DUO, SD card, multimedia card, smart media xD card), and a scanner 458 for scanning items such as still image photographs to be downloaded to computer 412. A hard disk drive interface 452*a*, magnetic disk drive interface 454*a*, an optical drive interface 456*a*, a USB drive interface 445*a*, and a scanner interface 458*a* operate to connect bus 424 to hard disk drive 452, magnetic disk drive 454, optical disk drive 456, USB drive 445 and scanner 458, respectively. Each of these drive components and their associated computer-readable media may provide computer 412 with non-volatile storage of computer-readable instruction, program modules, data structures, application programs, an operating system, and other data for computer 412. In addition, it will be understood that computer 412 may also utilize other types of computer-readable media in addition to those types set forth herein, such as digital video disks, random access memory, read only memory, other types of flash memory cards, magnetic cassettes, and the like.

Computer 412 may operate in a networked environment using logical connections with system 100. Network interface 428 provides a communication path 460 between bus 424 and network 110, 118, which allows, for example, a print order to be communicated from mobile computing device 102 through network 110 to photo lab system 106 or photofinisher 104. Other types of information, such as, data associated with a digital image, may also be communicated from bus 424 through a communication path 462 to network 118 using serial port 432 and a modem 464, for instance when stored digital image data is retrieved from digital image storage server 116 to mobile computing device 102. It will be appreciated that the network connections shown herein are merely exemplary, and it is within the scope of the present invention to use other types of network connections between computer 412 and photofinishers including both wired and wireless connections.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirements.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A system for ordering a print product using a mobile computing device, the print product is a good that can incorporate a selected digital image printed thereon, the system comprising:
    a photofinisher for receiving a print order uploaded by the mobile computing device and producing the print product based upon the print order;
    computer executable instructions that are configured for allowing the print order to be completed electronically through the mobile computing device, the print order including the selected digital image electronically accessed from a memory and the print product selected using the mobile computing device, wherein the computer executable instructions are configured to filter the print products available to be selected by the mobile computing device by automatic removal of print products not available for selection based upon at least one attribute of the digital image selected by the mobile computing device; and
    a wireless access point device providing a wireless local area network for automatically placing the mobile computing device in communication with the photofinisher upon the mobile computing device entering a range of the wireless local area network, and
    wherein the print order completed using the mobile computing device via the computer executable instructions is automatically communicated to the photofinisher by the mobile computing device when the mobile computing device is located within the range of the wireless local area network.

2. A system in accordance with claim 1, wherein the computer executable instructions are configured to allow for payment of the print order using the mobile computing device, and
    generating an order identifying indicator that is displayed on the mobile computing device after payment is completed.

3. A system in accordance with claim 1, wherein the computer executable instructions are stored in a memory located in either the mobile computing device or the photofinisher.

4. A system in accordance with claim 1, wherein the system includes a plurality of photofinishers, the system further comprising a photo lab system in communication with the plurality of photofinishers, wherein the photo lab system is configured to receive the print order from the mobile computing device and communicating the print order to one of the plurality of photofinishers.

5. A system in accordance with claim 4, wherein the computer executable instructions are stored in a memory located in the photo lab system.

6. A system in accordance with claim 1, wherein the memory is located in the mobile computing device or a digital image data storage server accessible by the mobile computing device through a wide area network.

7. A system in accordance with claim 1, wherein the computer executable instructions are configured to send a notification to the mobile computing device indicating that the ordered print product has been produced by the photofinisher and is ready to be picked up.

8. A system in accordance with claim 1, wherein the computer executable instructions are configured to allow a user of the mobile computing device to capture, save, and/or edit digital images in the memory, wherein the memory is located in the mobile computing device or a digital image data storage server accessible by the mobile computing device through a wide area network.

9. A method for ordering a print product using a mobile computing device, the print product is a good that can incorporate a digital image printed thereon, the method comprising:
 providing a photofinisher configured for receiving a print order uploaded from the mobile computing device and producing the print product based upon the print order;
 providing a wireless access point device for automatically placing the mobile computing device in communication with the photofinisher via a wireless local area network upon the mobile computing device entering a range of the wireless local area network;
 automatically communicating a print order inquiry to the mobile computing device when the mobile computing device enters the range of the wireless local area network;
 providing computer executable instructions that are configured to allow the print order to be completed electronically utilizing the mobile computing device after the print order inquiry is communicated to the mobile computing device, the print order including the digital image selected and electronically accessed from a memory and the print product selected using the mobile computing device;
 providing for the communication of the completed print order to the photofinisher when the mobile computing device is located within the range of the wireless local area network; and
 receiving the completed print order at the photofinisher.

10. A method in accordance with claim 9, further comprising:
 providing a plurality of photofinishers;
 providing a photo lab system in communication with the plurality of photofinishers;
 receiving the print order from the mobile computing device at the photo lab system; and
 communicating the print order to one of the plurality of photofinishers.

11. A method in accordance with claim 9, wherein the memory is located in the mobile computing device.

12. A method in accordance with claim 11, further comprising the steps of:
 determining that one or more digital images have been stored in the memory located in the mobile computing device within a predetermined time period prior to the mobile computing device entering the range of the wireless local area network,
 wherein the recognized one or more digital images are the subject of the print order inquiry; and
 prompting a user of the mobile computing device to enter the print order using one or more of the digital images of the print order inquiry.

13. A method in accordance with claim 9, further comprising:
 providing a remote digital image server; and
 allowing for the storage of the digital image in the memory, wherein the memory is located in the remote digital image server accessible by the mobile computing device through a wide area network.

14. A method in accordance with claim 9, further comprising allowing for payment of the print order using the mobile computing device.

15. A method in accordance with claim 14, further comprising generating an order identifying indicator that is displayed on the mobile device after payment is completed.

16. A method in accordance with claim 9, further comprising sending a notification to the mobile computing device indicating that the ordered print product has been produced by the photofinisher and is ready to be picked up.

17. A method in accordance with claim 9, wherein the print order created by the mobile computing device is automatically communicated to the photofinisher when the mobile computing device is located within the range of the wireless local area network.

18. A method in accordance with claim 9, further comprising filtering the print products available to be selected by the mobile computing device, by the computer executable instructions, by automatic removal of print products not available for selection based upon at least one attribute of the digital image selected by the mobile computing device.

19. A method in accordance with claim 9, wherein the computer executable instructions are configured to allow a user of the mobile computing device to capture, save, and/or edit digital images in the memory, wherein the memory is located in the mobile computing device or a digital image data storage server accessible by the mobile computing device through a wide area network.

20. A non-transitory computer readable medium having thereon computer executable instructions for execution by at least one processor in a computing environment for ordering a print product, wherein the computing environment includes a photofinisher and a wireless access point device, and wherein the photofinisher is configured for producing the print product based upon the print order, the computer executable instructions when executed by the at least one processor are configured for performing a method comprising:
 automatically placing a mobile computing device in communication with the photofinisher via a wireless local area network using the wireless access point device upon the mobile computing device entering a range of the wireless local area network;
 automatically communicating a print order inquiry to the mobile computing device when the mobile computing device enters the range of the wireless local area network;
 allowing a print order to be completed electronically utilizing the mobile computing device after the print order inquiry is communicated to the mobile computing device, the print order including a digital image selected and electronically accessed from a memory and the print product selected using the mobile computing device;
 providing for the communication of the completed print order to the photofinisher when the mobile computing device is located within the range of the wireless local area network; and
 receiving the completed print order at the photofinisher.

21. A non-transitory computer readable medium in accordance with claim 20, wherein the computing environment includes a plurality of photofinishers and a photo lab system in communication with the plurality of photofinishers, and wherein the method further comprises:
 receiving the print order from the mobile computing device at the photo lab system; and communicating the print order to one of the plurality of photofinishers.

22. A non-transitory computer readable medium in accordance with claim 20, wherein the memory is located in the mobile computing device.

23. A non-transitory computer readable medium in accordance with claim 22, wherein the method further comprises the steps of:
- determining that one or more digital images have been stored in the memory located in the mobile computing device within a predetermined time period prior to the mobile computing device entering the range of the wireless local area network,
- wherein the recognized one or more digital images are the subject of the print order inquiry; and
- prompting a user of the mobile computing device to enter the print order using one or more of the digital images of the print order inquiry.

24. A non-transitory computer readable medium in accordance with claim 20, wherein the computing environment includes a remote digital image server, and wherein the method further comprises:
- allowing for the storage of the digital image in the memory, wherein the memory is located in the remote digital image server accessible by the mobile computing device through a wide area network.

25. A non-transitory computer readable medium in accordance with claim 20, wherein the method further comprises allowing for payment of the print order using the mobile computing device.

26. A non-transitory computer readable medium in accordance with claim 25, wherein the method further comprises generating an order identifying indicator that is displayed on the mobile device after payment is completed.

27. A non-transitory computer readable medium in accordance with claim 20, wherein the method further comprises sending a notification to the mobile computing device indicating that the ordered print product has been produced by the photofinisher and is ready to be picked up.

28. A non-transitory computer readable medium in accordance with claim 20, wherein the print order created by the mobile computing device is automatically communicated to the photofinisher when the mobile computing device is located within the range of the wireless local area network.

29. A non-transitory computer readable medium in accordance with claim 20, wherein the method further comprises filtering the print products available to be selected by the mobile computing device by automatic removal of print products not available for selection based upon at least one attribute of the digital image selected by the mobile computing device.

30. A non-transitory computer readable medium in accordance with claim 20, wherein the method further comprises allowing a user of the mobile computing device to capture, save, and/or edit digital images in the memory, and wherein the memory is located in the mobile computing device or a digital image data storage server accessible by the mobile computing device through a wide area network.

* * * * *